United States Patent
Noguchi (10) Patent No.: US 8,310,552 B2
(45) Date of Patent: Nov. 13, 2012

(54) IMAGING APPARATUS

(75) Inventor: Masaaki Noguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 402 days.

(21) Appl. No.: 12/402,243

(22) Filed: Mar. 11, 2009

(65) Prior Publication Data

US 2009/0231452 A1 Sep. 17, 2009

(30) Foreign Application Priority Data

Mar. 11, 2008 (JP) ................................. 2008-061858
Feb. 6, 2009 (JP) ................................. 2009-025634

(51) Int. Cl.
*H04N 5/228* (2006.01)

(52) U.S. Cl. ............. 348/208.4; 348/208.99; 348/208.1; 348/208.3

(58) Field of Classification Search .. 348/208.99–208.4, 348/208.7, 208.8
See application file for complete search history.

(56) References Cited

U.S. PATENT DOCUMENTS

| 6,064,826 | A | * | 5/2000 | Washisu | 396/55 |
| 7,689,107 | B2 | * | 3/2010 | Enomoto | 396/53 |
| 2005/0270380 | A1 | * | 12/2005 | Tomita et al. | 348/208.99 |
| 2006/0176372 | A1 | * | 8/2006 | Moriya | 348/208.4 |

FOREIGN PATENT DOCUMENTS

JP 7-199263 A 8/1995

* cited by examiner

*Primary Examiner* — Anthony J Daniels
(74) *Attorney, Agent, or Firm* — Canon USA Inc IP Division (57) ABSTRACT

An imaging apparatus includes a correction unit, a vibration detection unit, a filter passing and outputting frequency of a predetermined band of vibration signals periodically entered from the vibration detection unit: the filter setting, as intermediate value, sum of a value based on a vibration signal of current period and a value based on a vibration signal of last period and setting, as output signal, a value obtained by adding a value based on intermediate value of the current period and a value based on intermediate value of the last period, a calculation unit calculating vibration correction amount, a driving control unit driving the correction unit by using the vibration correction amount, and an offset unit performing feedback control so that an intermediate value is shifted to predetermined value by changing the intermediate value and an offset value added to a signal based on output from the vibration detection unit.

10 Claims, 9 Drawing Sheets

FIG. 8B (PRIOR ART)
FIG. 9A (PRIOR ART)
FIG. 9B $Y[n] = X[n] \times a + X[n-1] \times b$ a, AND b ARE CONSTANTS, AND FILTER CHARACTERISTICS CHANGE DEPENDING ON SIGNS THEREOF

(PRIOR ART)
FIG. 9C (PRIOR ART)
FIG. 9D (PRIOR ART)
FIG. 9E (PRIOR ART)
FIG. 9F $Z[n] = Z[n-1] \times a + X[n]$ $Y[n] = Z[n] \times b + Z[n-1] \times c$ a, b AND c ARE CONSTANTS, AND FILTER CHARACTERISTICS CHANGE DEPENDING ON SIGNS THEREOF

IMAGING APPARATUS

BACKGROUND OF THE INVENTION

1. Field of the Invention

The present invention relates to an imaging apparatus which has an image stabilizing function.

2. Description of the Related Art

An imaging apparatus typified by a still camera or a video camera has an optical image stabilizing system or an image sensor image stabilizing system as a system for correcting vibrations such as camera shakes applied to the apparatus from the outside.

These systems perform digital signal processing on a signal from a vibration detection sensor which detects a vibration degree, via an analog-to-digital (A/D) conversion unit, calculate a vibration correction amount to execute digital-to-analog (D/A) conversion, and then drive a correction unit for image stabilizing, i.e., a shift lens or an image sensor.

An angular speed sensor is often used for vibration degree detection. This angular speed sensor vibrates a vibration material such as a piezoelectric element at a constant frequency, and converts Coriolis force generated by a rotational motion component into a voltage to obtain an angular speed signal.

As an apparatus for performing A/D conversion, digital signal processing, or D/A conversion, a microcomputer is used which includes a filter for cutting off a plurality of predetermined frequencies and an integration filter. Non-recursive and recursive digital filters are available as such filters.

Figures 9A, 9B:
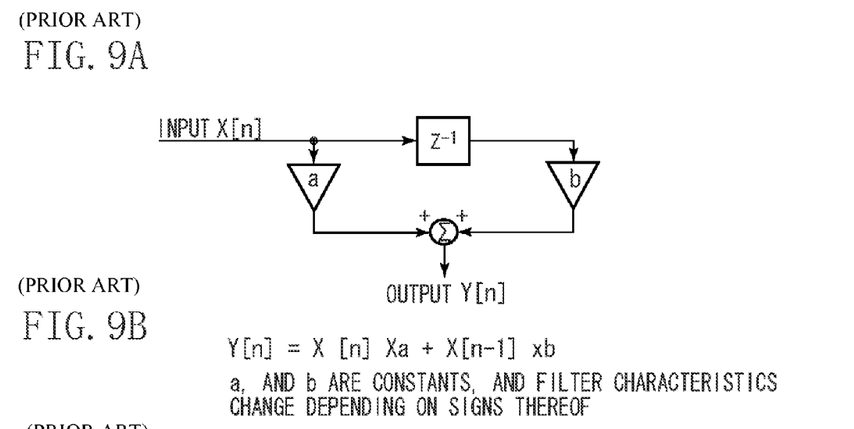
FIGS. 9A to 9F illustrate a primary digital filter according to the exemplary embodiment of the present invention.

FIG. 9A is an overall block diagram of a non-recursive primary digital filter. As compared with the recursive digital filter, the non-recursive digital filter includes only a feed-forward unit. When an input value X[n] is obtained at current sampling, an input value of last sampling is X[n−1], which is an intermediate value in the non-recursive digital filter. In other words, in the non-recursive digital filter, a value after passage through a delay element $Z^{-1}$ is an intermediate value.

FIG. 9B illustrates an operational expression when gains of the feed-forward unit are set to constants a and b. To configure a filter having desired characteristics, values and signs of the constants a and b are appropriately set. Setting these constants enables configuration of a digital high-pass filter or a digital low-pass filter. Secondary and higher-order digital filters are realized by increasing delay elements $Z^{-1}$. The number of intermediate values increases according to an order.

Figures 9C, 9D, 9E:
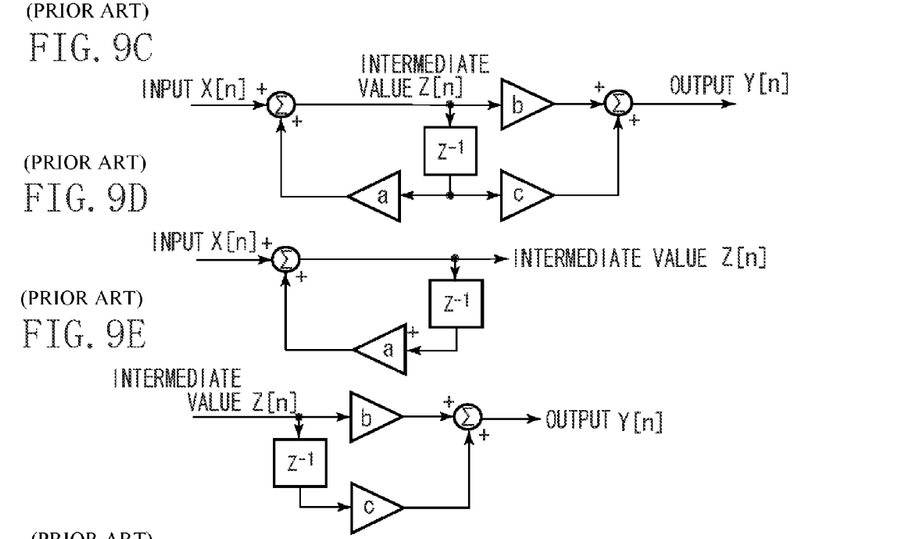

FIG. 9C is an overall block diagram of a recursive primary digital filter. The recursive digital filter includes a feed-forward unit and a feedback unit. In the recursive digital filter, an intermediate value is a calculation result of the feedback unit. In this case, an intermediate value Z[n] as shown in FIG. 9C is obtained at current sampling. A value after passage through a delay element $Z^{-1}$ indicates last sampling. The delay element determines a digital filter order.

FIG. 9D illustrates the feedback unit cut out from the recursive digital filter. An intermediate value Z[n] of current sampling is calculated from an input value X[n] of the current sampling and an intermediate value Z[n−1] of last sampling, where n denotes a sampling cycle.

FIG. 9E illustrates the feed-forward unit cut out from the recursive digital filter. An output value Y[n] of the current sampling is calculated from the intermediate value Z[n] of the current sampling and the intermediate value Z[n−1] of the last sampling, where n denotes a sampling cycle.

Figure 9F:
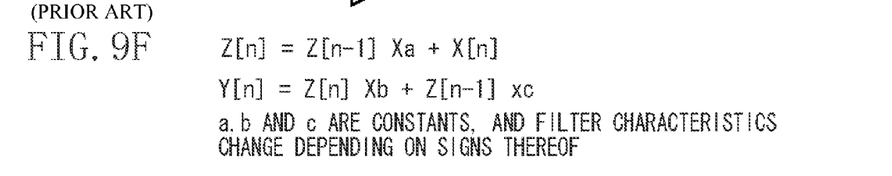

FIG. 9F illustrates an operational expression when gains of the feed-forward unit and the feedback unit are respectively set to constants a, b, and c. Secondary or higher order digital filters are realized by increasing delay elements $Z^{-1}$. The number of intermediate values is increased according to the increased order.

The optical image stabilizing system corrects image vibrations on the image sensor (removes image vibrations from an image formed on the image sensor) by moving the shift lens which is a correction unit within a plane orthogonal to an optical axis, to a driving target position calculated by using a vibration correction amount. The image sensor image stabilizing system corrects image vibrations on the image sensor by moving the image sensor which is a correction unit within the plane orthogonal to the optical axis, to a driving target position calculated by using a vibration correction amount. The present invention described below can be applied to both systems, and thus a configuration of the optical image stabilizing system will be described below as a representative example.

In the imaging apparatus having the image stabilizing function of the aforementioned system, a shift lens drive unit is instructed to move by a vibration correction amount. When the shift lens that is a control target reaches a driving target position, a real position of the shift lens is obtained. Feedback control is performed to reduce a deviation between the driving target position and the real position to zero. As one example of a technique for performing such feedback control, Japanese Patent Application Laid-Open No. 7-199263 discusses a technique of returning a shift lens to a predetermined position within a driving range before exposure when a driving amount of the shift lens is large.

A technique of removing an offset may have a following configuration. The configuration includes a unit for differentially amplifying a signal from a sensor and a reference voltage, a unit for calculating an offset component from the amplified signal, and a unit for changing the reference voltage. An offset is calculated by microcomputer processing, and the reference voltage of an amplifier is accordingly changed to remove an offset component from the amplified signal. By applying this technique to a vibration correction, an offset component is calculated from a vibration amount of the amplified signal output from an angular speed sensor, and the reference voltage of the amplifier is changed according to the offset amount, whereby the offset component of the amplified vibration signal is removed.

However, this system necessitates a new hardware mechanism such as a D/A conversion unit for changing the reference voltage. In the system, the amplifier vibration signal stepwise fluctuates immediately after the reference voltage change of the amplifier, and vibrations are erroneously detected when actually no vibration is detected. When the shift lens is driven by using such erroneously detected vibration signal, a problem may occur that a shot image moves unnaturally or a vibrated image is captured due to the processing for reference voltage change depending on an exposure timing.

SUMMARY OF THE INVENTION

The present invention is directed to an apparatus or a method which can easily remove an offset component of a vibration signal used for vibration correction amount calculation without any hardware component.

According to an aspect of the present invention, an imaging apparatus includes a correction unit movable within a plane orthogonal to an optical axis, a vibration detection unit configured to detect vibrations applied to the imaging apparatus, a filter configured to pass and output a frequency of a predetermined band of vibration signals periodically entered from the vibration detection unit, wherein the filter is configured to set, as an intermediate value, a sum of a value based on a vibration signal of a current period and a value based on a vibration signal of a last period, and to set, as an output signal, a value obtained by adding together a value based on an intermediate value of the current period and a value based on an intermediate value of the last period, a calculation unit configured to calculate a vibration correction amount based on an output from the filter, a driving control unit configured to drive the correction unit by using the vibration correction amount to perform a vibration correction, and an offset unit configured to perform feedback control in a manner that an intermediate value is shifted to a predetermined value by changing the intermediate value and an offset value added to a signal based on an output from the vibration detection unit.

According to another aspect of the present invention, an imaging apparatus includes a correction unit movable within a plane orthogonal to an optical axis, a vibration detection unit configured to detect vibrations applied to the imaging apparatus, a filter configured to pass and output a frequency of a predetermined band of vibration signals periodically entered from the vibration detection unit, wherein the filter is configured to set a sum with a value based on a vibration signal of a last period as an intermediate value, and to output a value obtained by adding together a value based on a vibration signal of a current period and the intermediate value, a calculation unit configured to calculate a vibration correction amount based on an output from the filter, a driving control unit configured to drive the correction unit by using the vibration correction amount to perform a vibration correction, and an offset unit configured to perform feedback control in a manner that an intermediate value is shifted to a predetermined value by changing the intermediate value and an offset value added to a signal based on an output from the vibration detection unit.

The exemplary embodiments of the present invention provide an imaging apparatus which can easily remove an offset component of a vibration signal used for vibration correction amount calculation without any hardware component.

Other features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
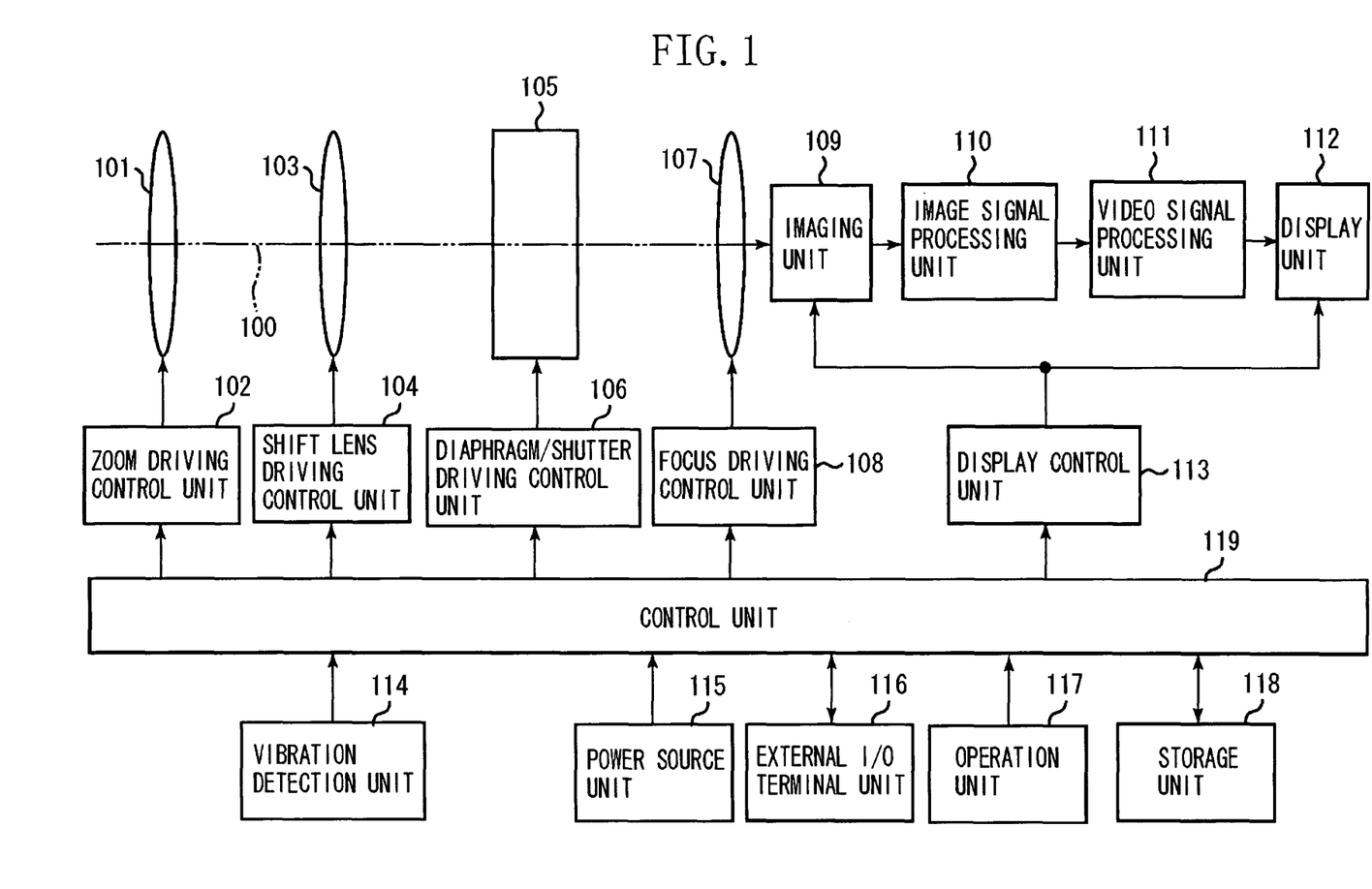
FIG. 1 illustrates a configuration of an imaging apparatus according to an exemplary embodiment of the present invention.

FIG. 1 illustrates a configuration of an imaging apparatus which has an image stabilizing function according to a first exemplary embodiment of the present invention. In FIG. 1, a zoom unit 101 includes a zoom lens for magnification. A zoom driving control unit 102 controls driving of the zoom unit 101. A shift lens 103 as an example of a correction unit for image stabilizing can change its position within a plane orthogonal to an optical axis 100. A shift lens driving control unit 104 controls driving of the shift lens 103. When power is to be saved, a control unit 119 described below stops power supplying to the shift lens driving control unit 104.

The imaging apparatus further includes a diaphragm shutter unit 105. A diaphragm shutter driving control unit 106 controls driving of the diaphragm shutter unit 105. A focus unit 107 includes a lens for focus adjustment. A focus driving control unit 108 controls driving of the focus unit 107. An imaging unit 109 uses an image sensor such as a charge coupled device (CCD), and converts a light image passed through each lens group into an electric signal. An image signal processing unit 110 converts the electric signal output from the imaging unit 109 into a video signal. A video signal processing unit 111 processes the video signal output from the image signal processing unit 110 according to intended use. A display unit 112 displays an image based on the video signal output from the video signal processing unit 111 when necessary. A display control unit 113 controls an operation and display of the imaging unit 109 and the display unit 112.

A vibration detection unit 114 such as an angular speed sensor detects a degree of vibrations applied to the imaging apparatus. A power source unit 115 supplies power to the entire system according to intended use. An external I/O terminal unit 116 enters/outputs a communication signal or a video signal from and to the outside. An operation unit 117 operates the system. A storage unit 118 stores various data such as video information. The control unit 119 controls the entire system.

Next, an operation of the imaging apparatus thus configured will be described.

The operation unit 117 includes a shutter release button configured to sequentially turn ON first and second switches (SW1 and SW2) according to a pressing amount. The first switch is turned ON when the shutter release button is pressed about half, and the second switch is turned ON when the shutter release button is pressed to the maximum. After the first switch is turned ON, the control unit 119 drives the focus unit 107 to adjust a focus via the focus driving control unit 108. Simultaneously, the control unit 119 drives the diaphragm shutter unit 105 via the diaphragm shutter driving control unit 106 to set an appropriate exposure amount. When the second switch is turned ON, the control unit 119 stores image data obtained from an exposure light image formed at the imaging unit 109 in the storage unit 118.

In this case, if instructed to enable the image stabilizing function by the operation unit 117, the control unit 119 instructs the shift lens driving control unit 104 to perform an image stabilizing operation. The shift lens driving control unit 104 that has received the instruction drives the shift lens 103 until an instruction for disabling the image stabilizing function is issued. More specifically, the shift lens driving control unit 104 moves the shift lens 103 in a direction that cancels vibrations within the plane orthogonal to the optical axis 100 to perform an image stabilizing operation.

If the operation unit 117 has not been operated for a given length of time, the control unit 119 cuts off power to the display unit 112 or the shift lens driving control unit 104 to save power.

In the imaging apparatus, the operation unit 117 can select one of static image and moving image shooting modes, and operation conditions of each driving control unit can be changed in each mode.

If instructed to perform magnification by the operation unit 117, the control unit 119 drives the zoom unit 101 via the zoom driving control unit 102 to move it to an instructed zoom position. At the same time, based on image information sent from the imaging unit 109 and processed by the signal processing units 110 and 111, the control unit 119 drives the focus unit 107 to adjust a focus via the focus driving control unit 108.

Figure 2:
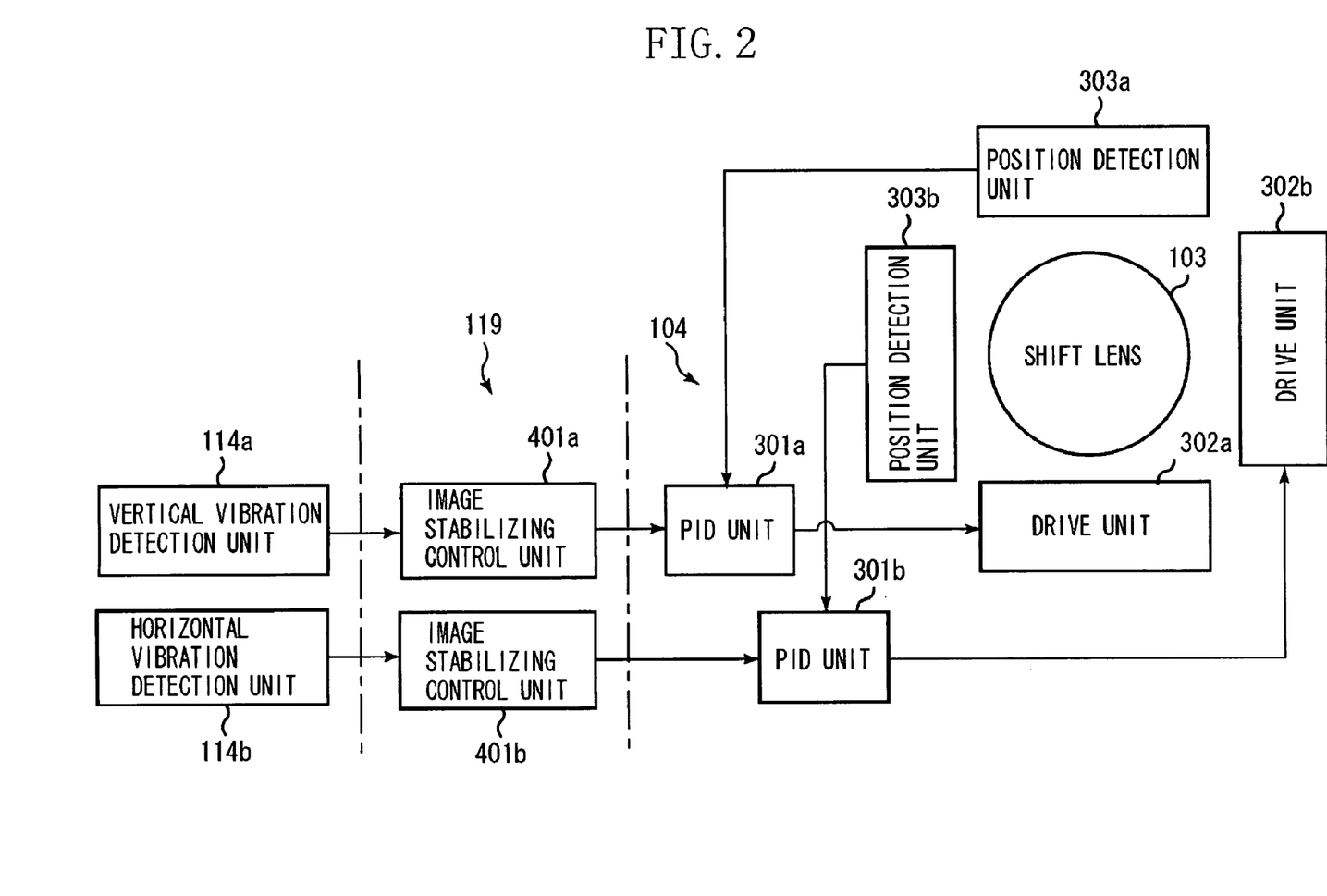
FIG. 2 is a block diagram illustrating an image stabilizing processing system which includes a shift lens driving control unit according to the exemplary embodiment of the present invention.

FIG. 2 is a block diagram illustrating an internal configuration of the shift lens driving control unit 104 and a circuitry placed before the same.

First, the configuration placed before the shift lens driving control unit 104 will be described. A vertical vibration detection unit 114a detects vertical (pitch-direction) vibrations of the imaging apparatus in a normal posture. A horizontal vibration detection unit 114b detects horizontal (yaw-direction) vibrations of the imaging apparatus in the normal posture. Image stabilizing control units 401a and 401b included in the control unit 119 calculate vibration correction amounts in pitch and yaw directions to decide a driving target position of the shift lens 103, and outputs them to the shift lens driving control unit 104.

Next, the configuration of the shift lens driving control unit 104 will be described. PID units 301a and 301b that are feedback control units in the pitch and yaw directions obtain control amounts from a deviation between the driving target position and a real position signal (described below) indicating a current position of the shift lens 103 to output position command signals. Drive units 302a and 302b in the pitch and yaw directions drive the shift lens 103 based on the position command signals sent from the PID units 301a and 301b. Position detection units 303a and 303b in the pitch and yaw directions detect current positions of the shift lens 103 in the respective directions to output real position signals to the PID units 301a and 301b.

Next, position control of the shift lens 103 performed by the shift lens driving control unit 104 will be described.

In the position control of the shift lens 103, the shift lens driving control unit 104 drives the shift lens 103 in the pitch and yaw directions based on signals indicating vibrations of the imaging apparatus from the vibration detection units 114a and 114b. A magnet is attached to the shift lens 103. The position detection units 303a and 303b detect a magnetic field of the magnet to output real position signals of the shift lens 103 to the PID units 301a and 301b. The PID units 301a and 301b perform feedback control so that the entered real position signals can converge on the driving target position sent from the image stabilizing control units 401a and 401b. In this case, the PID units 301a and 301b perform PID control in which proportion (P) control, integration (I) control, and differentiation (D) control are selectively combined.

Thus, even when vibrations such as camera shakes occur in the imaging apparatus, the image vibrations can be appropriately corrected.

Figure 3:
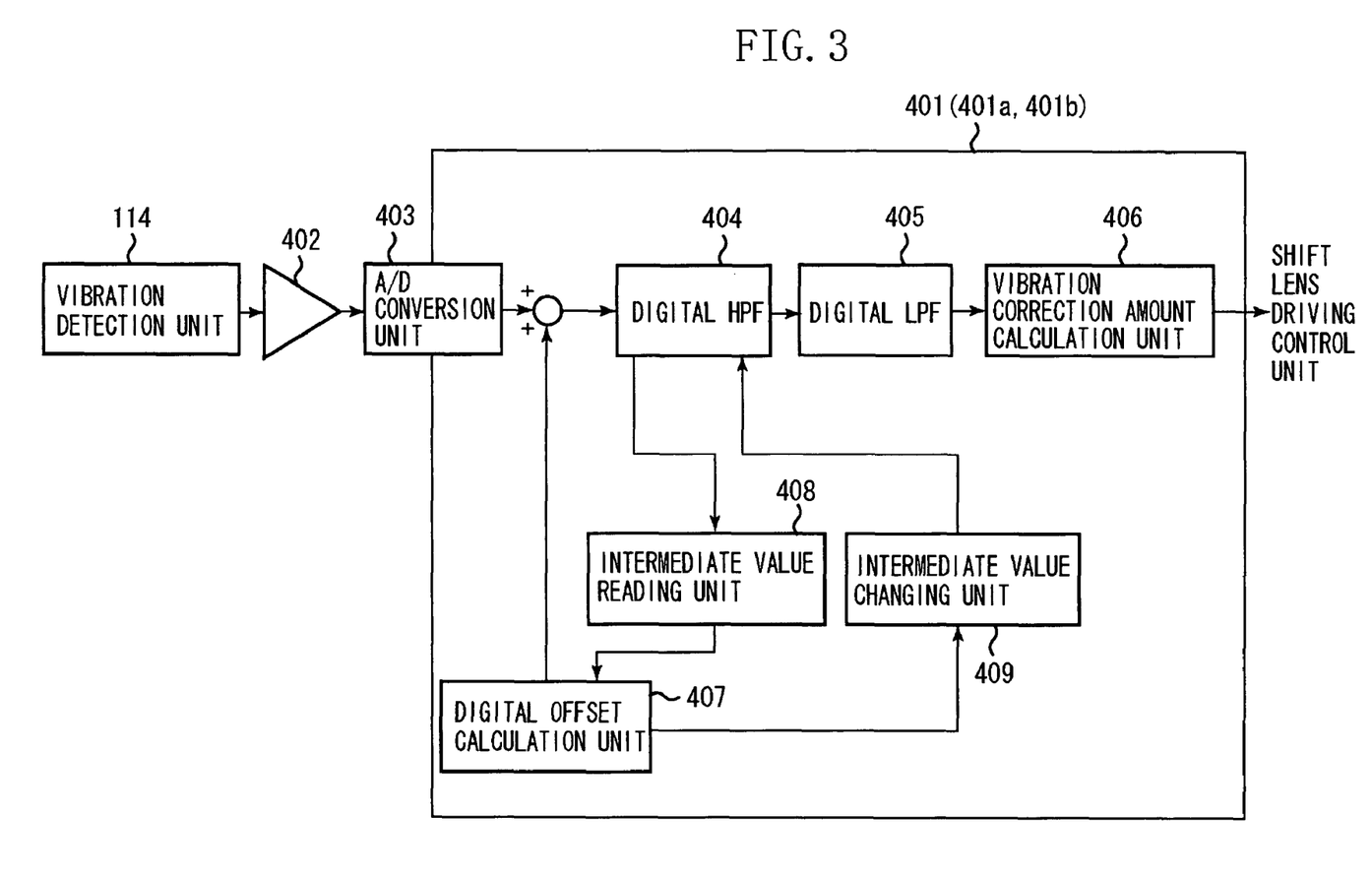
FIG. 3 is a block diagram illustrating an image stabilizing control unit in detail according to a first exemplary embodiment of the present invention.

FIG. 3 is a block diagram illustrating a circuitry of the vibration stabilizing unit 401 (401a and 401b) of FIG. 2 in detail.

FIG. 3 illustrates a vibration detection unit 114 such as an angular speed sensor, which is used in the first exemplary embodiment. An amplifier 402 amplifies a vibration signal (vibration output) from the vibration detection unit 114. An A/D converter 403 converts the amplified vibration signal into a digital signal. An image stabilizing control unit 401 is mainly realized by calculation in a microcomputer. A digital high-pass filter (digital HPF) 404 is capable of changing a cutoff frequency to cut off a DC component and referred to as a recursive primary digital filter in the present exemplary embodiment. A digital low-pass filter (digital LPF) 405 converts an angular speed signal, which is a vibration signal, into an angular signal. A vibration correction amount calculation unit 406 calculates a vibration correction amount of the shift lens 103 based on the vibration signal. A digital offset calculation unit 407 calculates a digital offset with respect to a vibration amount after A/D conversion. An intermediate value reading unit 408 reads an intermediate value of the digital high-pass filter 404. An intermediate value changing unit 409 changes the intermediate value of the digital high-pass filter 404. In this case, the filter configuration can include not only the digital high-pass and low-pass filters but also a phase compensation filter therebetween.

Figure 4:
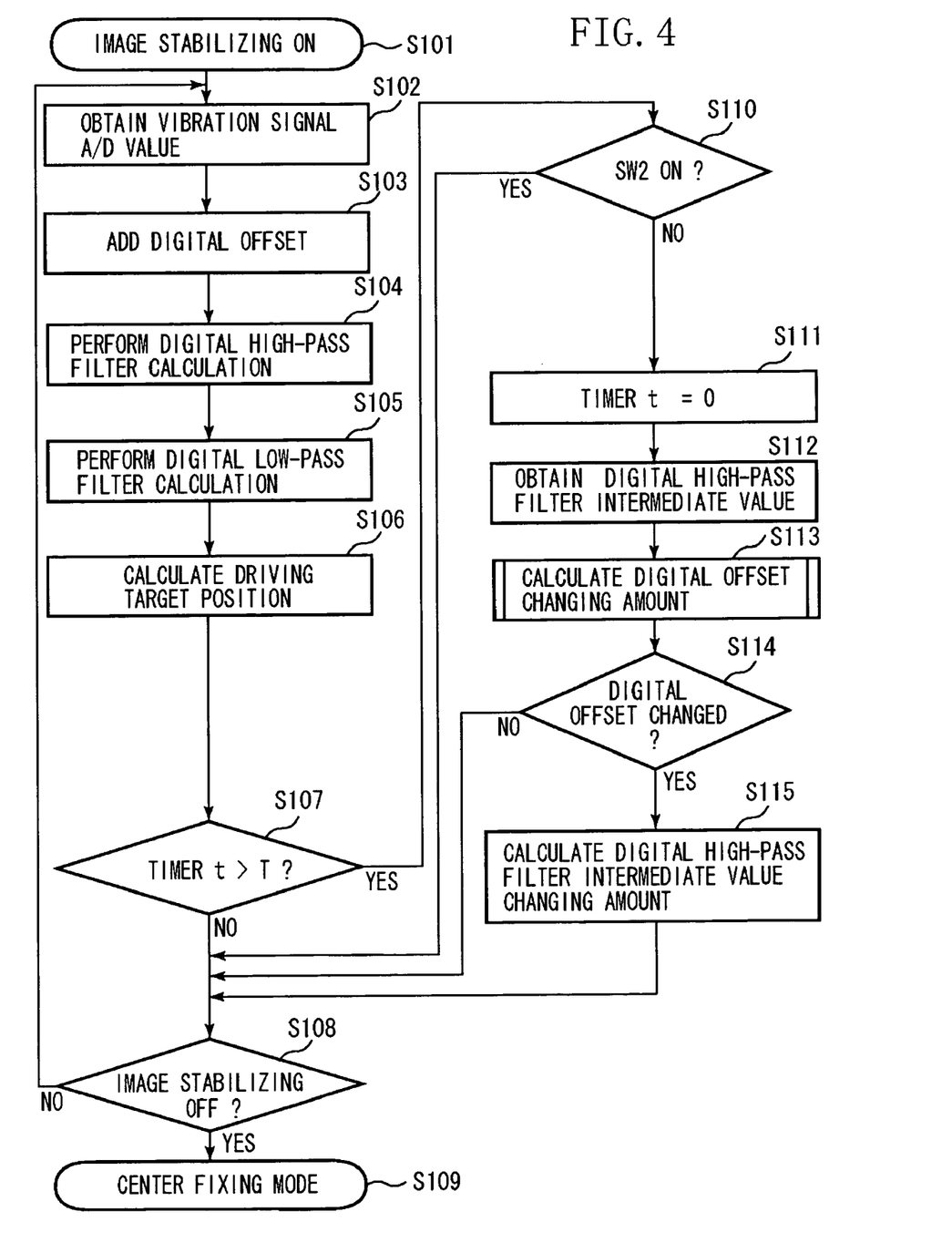
FIG. 4 is a flowchart illustrating an operation which includes digital offset compensation according to the first exemplary embodiment of the present invention.

Next, referring to a flowchart of FIG. 4, an operation including digital offset compensation performed at the image stabilizing control unit 401 for an output from the vibration detection unit 114 such as an angular speed sensor will be described.

After image stabilizing is turned ON (instructed to enable the image stabilizing function) in step S101, first, in step S102, an analog vibration signal amplified by the amplifier 402 and output from the vibration detection unit 114 is entered to the A/D converter 403. Then, the image stabilizing control unit 401 executes A/D conversion of the vibration signal to obtain a digital vibration signal. In step S103, the image stabilizing control unit 401 adds a digital offset calculated by the digital offset calculation unit 407 to the digitized vibration signal as described below. The digital offset is added for the purpose of canceling an offset component of the digitized vibration signal. The digital offset is equivalent to the offset component, and means a value having a sign opposed to that of the offset component. The digital offset is added by software processing to remove the offset component contained in the vibration signal which is an angular speed signal from a value entered to the digital HPF. The digital offset addition is referred to as digital offset compensation. In subsequent step S104, the image stabilizing control unit 401 removes a DC component from the vibration signal subjected to digital offset compensation with the digital high-pass filter 404. A digital offset value immediately after the vibration stabilizing is turned ON in step S101, in other words, an initial value of the digital offset value, is zero.

In step S105, the image stabilizing control unit 401 converts an angular speed signal (i.e., vibration signal) from which a DC component is removed, into an angular signal through the digital low-pass filter 405. In step S106, the image stabilizing control unit 401 calculates a driving target position of the shift lens 103 by the vibration correction amount calculation unit 406.

The digital offset compensation has a DC component removing effect similar to the digital high-pass filter 404 configured to remove a DC component. A reason for additionally performing the digital offset compensation on a value which is input into the digital high-pass filter 404 will be described. It is to be noted that the digital offset compensation is carried out at the intermediate value reading unit 408 and the digital offset calculation unit 407 in step S111 and after (described below in detail).

In the case of a recursive digital high-pass filter illustrated in FIG. 9C, where an intermediate value output from a feedback unit (FIG. 9D) (i.e., a prior stage) stabilizes depending on an amplitude of an offset of a filter input value and a cutoff frequency fc of the filter. To be exact, the value depends on a gain a of the feedback unit. When the digital high-pass filter 404 is a recursive digital high-pass filter illustrated in FIG. 9C, if calculation is started from an initializing state due to starting time, the intermediate value continuously fluctuates until it stabilizes according to an output of the vibration detection unit 114 which includes an angular speed sensor. During this period, a feed-forward unit (FIG. 9E) that is a stage subsequent to the digital high-pass filter 404, outputs a difference from last sampling, and thus the digital high-pass filter 404 sends excessive outputs. (With respect to a configuration of a digital high-pass filter, a gain c is a minus constant and, as a result, a difference from last sampling after coefficient integration is output. Refer to FIG. 9F). The outputs are stored in the digital low-pass filter 405 which performs next integration calculation, so that erroneous detection occurs, which prevents correct image stabilizing (vibration prevention).

To improve image stabilizing performance, a cutoff frequency of the digital high-pass filter 404 has to be lowered to reduce a phase of the digital high-pass filter 404 around a low frequency. In this case, the gain a of the feedback unit is increased, and the stabilizing value of the intermediate value is increased, resulting in a high degree of erroneous detection.

Similarly, when no analog high-pass filter is used on the output side of the vibration detection unit 114 to improve performance or to reduce the number of components, an offset of an output of the vibration detection unit 114 fluctuates due to temperature drifting or the like. Also in this case, when the offset is increased, the stabilizing value of the intermediate value of the digital high-pass filter 404 is increased, resulting in a higher degree of erroneous detection.

Thus, when image stabilizing performance is improved, the cutoff frequency of the digital high-pass filter 404 is lowered, and an offset is generated in the output of the vibration detection unit 114, so that a dilemma that image stabilizing performance becomes unstable is created.

One of the methods to solve this problem may be removing of the offset component of the input value of the digital high-pass filter 404. The above-mentioned is the reason for executing the digital offset compensation before the high-pass filter entry.

Referring back to FIG. 4, in step S107, the image stabilizing unit 401 determines whether a count value of a timer t has passed an update period T. The update period T means a period of performing digital offset compensation, e.g., 1 millisecond. If it is determined that the count value has not passed the update period T (No in step S107), the image stabilizing control unit 401 proceeds to step S108 to determine whether image stabilizing is OFF (whether image stabilizing function is disabled). If image stabilizing is kept ON (NO in step S108), the image stabilizing control unit 401 returns, in order to continue image stabilizing, to step S102 and repeats the above operation. If it is determined that image stabilizing is OFF (YES in step S108), the image stabilizing control unit 401 proceeds to step S109 to set a center fixing mode that fixes the shift lens 103 to a driving center (matching the center of the optical axis 100), thereby finishing the image stabilizing calculation. Thus, if image stabilizing is turned OFF, neither calculation nor changing of a digital offset is carried out.

If it is determined in step S107 that the count value the timer t has passed the update period T, the image stabilizing control unit 401 proceeds to step S110 to determine whether the second switch (SW2) is ON, in other words, whether exposure is in progress. If it is determined that exposure is in progress (YES in step S110), the process returns to step S108. In this case, the image stabilizing control unit 401 holds a last value of a digital offset, and does not change an intermediate value Z of the digital high-pass filter 404. In other words, during the exposure, the image stabilizing unit 401 stops changing of the digital offset.

If it is determined in step S110 that the second switch is not ON, in other words, exposure is not in progress (NO in step S110), the process enters a routine of digital offset compensation of step S111 and after.

Figure 5:
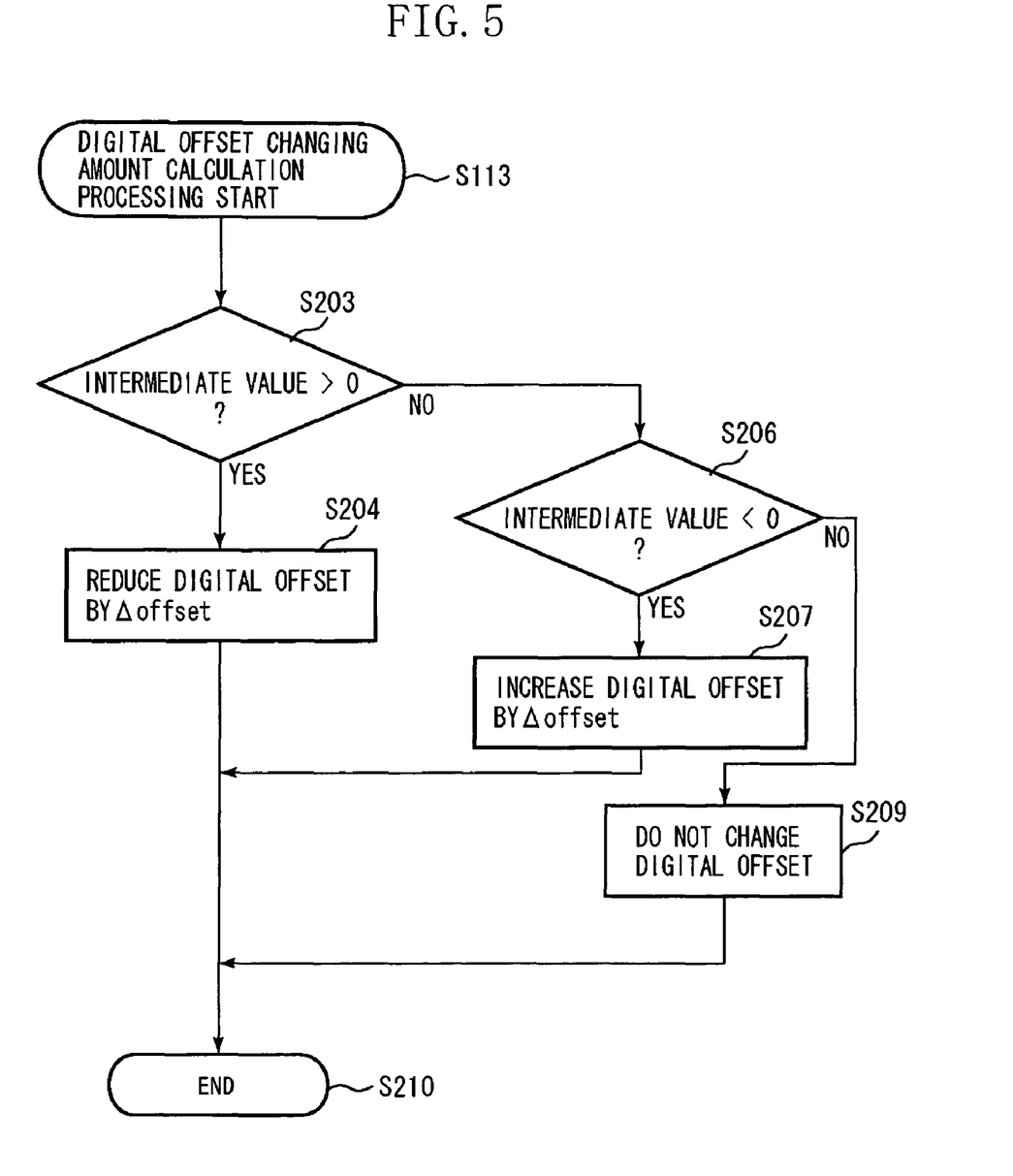
FIG. 5 is a flowchart illustrating digital offset processing according to the first exemplary embodiment of the present invention.

In the routine of digital offset compensation, first, in step S111, the image stabilizing control unit 401 initializes the timer to 0 (timer t=0). In step S112, the image stabilizing control unit 401 obtains an intermediate value Z of the digital high-pass filter 404 with the intermediate value reading unit 408. In subsequent step S113, the image stabilizing control unit 401 calculates a changing amount of a current digital offset from the intermediate value with the digital offset calculation unit 407. In this case, the image stabilizing control unit 401 calculates a digital offset so that the intermediate value can be zero. Referring to FIG. 5, a specific method of calculating the changing amount of a digital offset will be described below.

After starting of the digital offset changing amount calculation in step S113, first, in step S203, the image stabilizing control unit 401 determines whether the intermediate value of the digital high-pass filter 404 obtained in step S112 is larger than 0. If it is determined that the intermediate value is larger than 0 (YES in step S203), the image stabilizing control unit 401 proceeds to step S204 to reduce a digital offset by Δoffset and then the processing ends S210. On the other hand, if it is determined that the intermediate value is not larger than 0 (NO in step S203), the image stabilizing control unit 401 proceeds from step S203 to step S206 to determine whether the intermediate value is smaller than 0. If it is determined that the intermediate value is smaller than 0 (YES in step S206), the image stabilizing control unit 401 proceeds to step S207 to increase the digital offset by Δoffset. If it is determined that the intermediate value is not smaller than 0, in other words, the intermediate value is 0 (NO in step S206), the image stabilizing control unit 401 proceeds to step S209 to hold the digital offset and the intermediate value without making any changes.

A value of Δoffset is a constant set based on a relationship with an update period T. If a value of Δoffset is large, or the update period T is short, time until offset removal is short (followability is improved). On the other hand, a vibration suppressing effect is reduced since a vibration component detected by the vibration detection unit 114 works in a canceling direction. Thus, in consideration of followability and a vibration suppression effect, a value of Δoffset is decided according to the update period T.

Referring back to FIG. 4, in step S114, the image stabilizing control unit 401 determines whether the digital offset has been changed. If it is determined that the digital offset has not been changed (NO in step S114), the image stabilizing control unit 401 returns to step S108 while keeping a last value of the digital offset. In this case, the image stabilizing control unit 401 does not change the intermediate value Z of the digital high-pass filter 404 by the intermediate value changing unit 409.

On the other hand, if it is determined that the digital offset has been changed (YES in step S114), the process proceeds from step S114 to step S115. In step S115, the image stabilizing control unit 401 calculates a changing amount of the intermediate value Z of the digital high-pass filter 404 to change the intermediate value.

The changing amount of the intermediate value Z is represented by the following expression (1):

$$\Delta Z = \Delta \text{offset}/(1-a) \quad (1)$$

If the digital offset is reduced by Δoffset in step S204 of FIG. 5, a changing amount is set (calculated) to reduce the intermediate value by ΔZ. If the digital offset is increased by Δoffset in step S207, a changing amount is set to increase the intermediate value by ΔZ.

In other words, when the digital offset is changed to remove the offset component of the input value of the digital high-pass filter 404 by feedback control, discontinuity occurs in output of the digital high-pass filter 404. Thus, to prevent discontinuity in output of the digital high-pass filter 404, the changing amount of the intermediate value of the digital high-pass filter 404 is calculated by the intermediate value changing unit 409 to change the intermediate value. As a result, changing of the digital offset (step S113) and changing of the intermediate value (step S115) are carried out in the same sampling of image stabilizing control.

An idea of digital offset calculation will be described below. When a digital offset is added to a vibration signal of an A/D converted vibration signal (angular speed signal), a digital high-pass filter entry can be represented by the following expression (2):

$$\text{Digital HPF entry} = A/D \text{ converted vibration signal} + \text{digital offset} \quad (2)$$

In digital offset processing, when the A/D converted vibration signal contains an offset component, a value (digital offset) is set to cancel the offset component. For the digital offset, the right side of the expression (2) is desirably zero in a static state where the vibration detection unit 114 detects no vibration.

In other words, the A/D converted vibration signal contains a DC component that can change even in the static state due to a temperature or the like, and a camera shake signal is superimposed on this signal. The digital offset cancels the DC component. For example, when the DC component contained in the A/D converted vibration signal is "+10", the digital offset is gradually updated to reach "−10" according to the update period T while referring to the intermediate value Z.

A reason for changing the digital offset and the intermediate value in the same control sampling will be described below.

When the digital offset is changed, the input value of the high-pass filter 404 changes. The change of the input value of the high-pass filter 404 causes a change of a value at which the intermediate value of the feedback unit in the recursive digital filter stabilizes. While the intermediate value shifts from a current value to the stabilizing value after the digital offset is changed, the digital high-pass filter 404 outputs a difference from last sampling at the feed forward unit. However, by adjusting a stabilizing value (predetermined value ΔZ) of the intermediate value changed by a changing amount Δoffset of the digital offset within the same sampling with respect to the intermediate value, this erroneous detection can be prevented. In other words, when the changing amount Δoffset of the digital offset within the same sampling is changed, the intermediate value is changed by a predetermined value ΔZ within the same sampling. As a result, the stabilizing value of the intermediate value changes, so that an output of the digital high-pass filter 404 can be prevented from becoming discontinous. Thus, the difference from the last sampling that the digital high-pass filter 404 has output at the feed forward unit becomes erroneous detection.

According to the first exemplary embodiment, the following effects are obtained even if a temperature change or the like of the vibration detection unit 114 such as an angular speed sensor causes fluctuations in size of the offset component of the output (vibration output). The offset component of vibration correction amount calculation can be removed without providing any hardware component for changing a reference voltage of the amplification unit 402 configured to amplify a difference between a vibration output voltage and the reference voltage.

The digital offset is decided while performing feedback control to set the intermediate value of the digital high-pass filter 404 to zero. The offset component can accordingly be removed easily. Thus, no erroneous output occurs, which may appear until the intermediate value is stabilized. Thus, an operation at the time of starting is stabilized.

Moreover, while the digital offset is changed, the intermediate value is adjusted. Thus, the offset component can be removed without generating any discontinuity in the vibration signal output from the digital high-pass filter 404.

Figure 6:
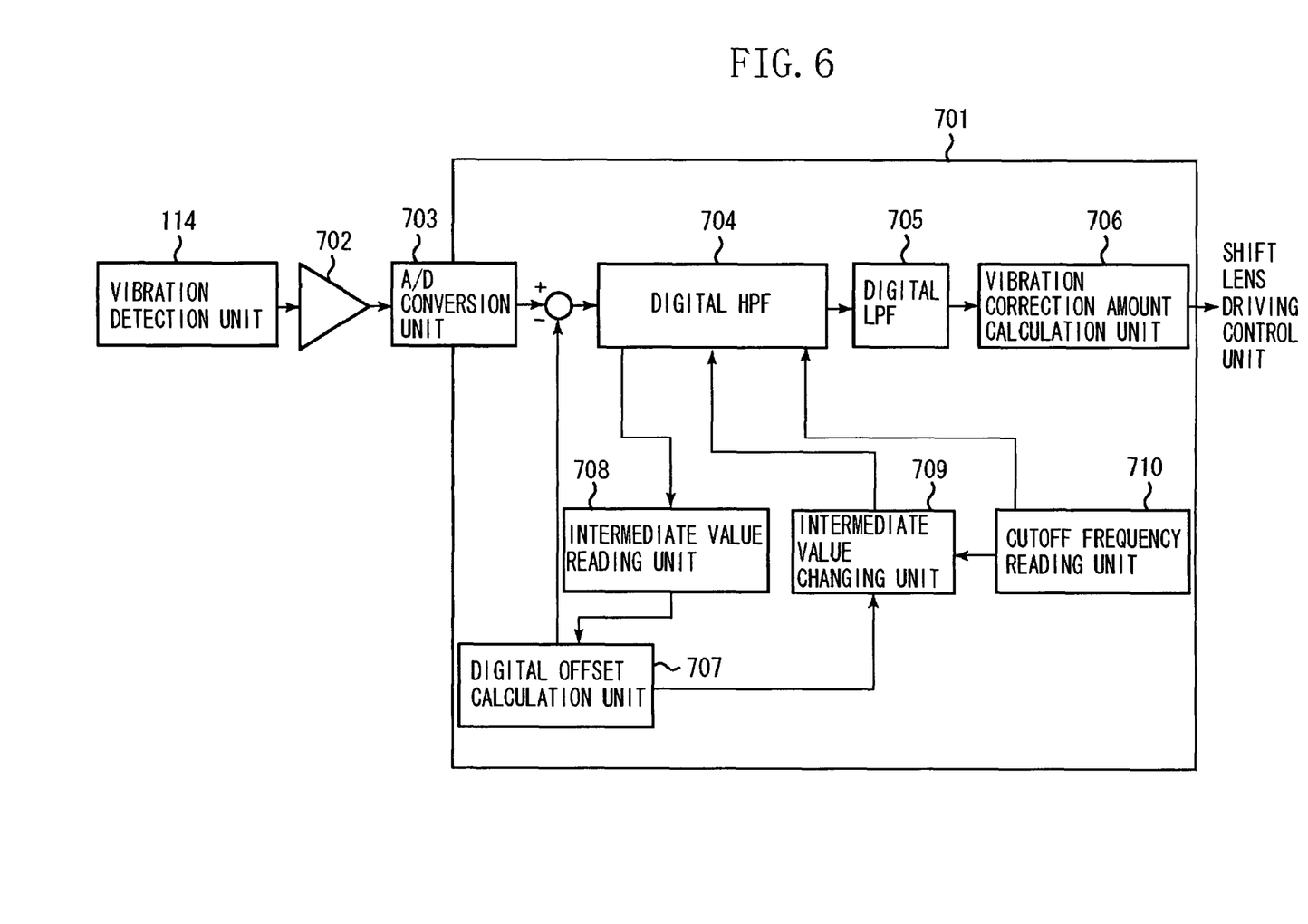
FIG. 6 is a block diagram illustrating an image stabilizing control unit in detail according to a second exemplary embodiment of the present invention.

FIG. 6 is a block diagram illustrating a circuitry of an image stabilizing control unit according to a second exemplary embodiment of the present invention. An imaging apparatus and other components are similar to those of the first exemplary embodiment illustrated in FIGS. 1 and 2, and thus description thereof will be omitted.

In FIG. 6, the circuitry includes an image stabilizing control unit 701, an amplifier 702 configured to amplify a vibration signal from a vibration detection unit 114, and an A/D converter 703 configured to convert the amplified vibration signal into a digital signal. A digital high-pass filter (digital HPF) 704 is capable of changing a cutoff frequency for cutting off a DC component. A digital low-pass filter (digital LPF) 705 converts an angular speed signal which is a vibration signal into an angular signal. A vibration correction amount calculation unit 706 calculates a vibration correction amount of a shift lens 103 from the vibration signal. A digital offset calculation unit 707 calculates a digital offset with respect to a vibration amount after A/D conversion. An intermediate value reading unit 708 reads an intermediate value of the digital high-pass filter 704. An intermediate value changing unit 709 changes the intermediate value of the digital high-pass filter 704.

The circuitry further includes a cutoff frequency reading unit 710 of the digital high-pass filter 704. In image stabilizing control, when a cutoff frequency of the digital high-pass filter 704 is changed to perform panning control, the cutoff frequency of the digital high-pass filter 704 varies depending on the control state. When the cutoff frequency is changed, in the case of a recursive primary digital high-pass filter, constants a, b and c of FIG. 9C are changed. For example, as to the constant a necessary for obtaining ΔZ, when the cutoff frequency is changed from 0.1 Hz to 0.2 Hz, the value the constant a is desirably changed from 65530 to 65525. In other words, in the case of changing to a high-pass filter of desired characteristics, the constant a is changed, and ΔZ is accordingly affected.

Thus, according to the exemplary embodiment, when the digital offset calculation unit 707 decides a changing amount of the digital offset, the intermediate value changing unit 709 decides an intermediate value changing amount by using also cutoff frequency information of the cutoff frequency reading unit 710.

Figure 7:
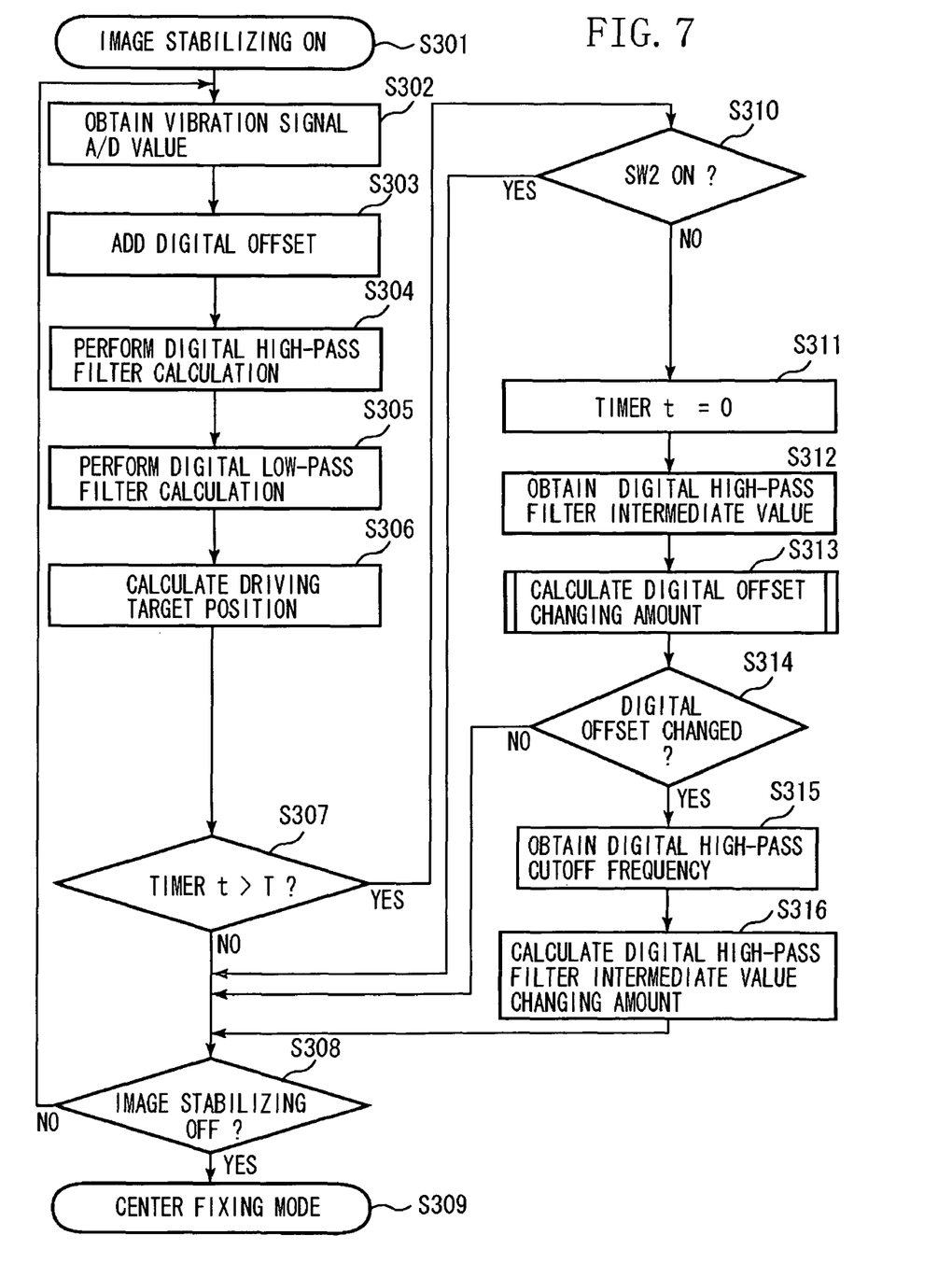
FIG. 7 is a flowchart illustrating an operation which includes digital offset compensation according to the second exemplary embodiment of the present invention.

Next, referring to a flowchart of FIG. 7, an operation including digital offset compensation performed at the image stabilizing control unit 701 for an output from the vibration detection unit 114 serving as an angular speed sensor will be described. Steps S301 to S314 of FIG. 7 are similar to steps S101 to S114 of the flowchart of FIG. 4, and thus description thereof will be omitted.

If it is determined in step S314 that the digital offset has been changed (YES in step S314), the image stabilizing control unit 701 proceeds to step S315 to obtain a cutoff frequency (more specifically, constant a which is a gain at this time) of the digital high-pass filter 704. Then, in step S316, the image stabilizing control unit 701 calculates a changing amount of the intermediate value Z of the digital high-pass filter 704 by using the changed digital offset and the read cutoff frequency. The changing amount of the intermediate value Z can be represented by the following expression (3):

$$\Delta Z = \Delta \text{offset}/(1-a) \quad (3)$$

Digital offset processing of the second exemplary embodiment is similar to that of FIG. 5, and thus description thereof will be omitted.

According to the second exemplary embodiment the following effects are achieved even if a temperature change or the like of the vibration detection unit 114 such as an angular speed sensor causes fluctuations in size of the offset component of the output (vibration output). As in the case of the first exemplary embodiment, the offset component of vibration correction amount calculation can be removed without providing any hardware component for changing a reference voltage of the amplification unit 702 configured to amplify a difference between a vibration output voltage and the reference voltage.

The digital offset is decided while performing feedback control to set the intermediate value of the digital high-pass filter 704 to zero. The offset component can accordingly be removed easily. Therefore, no erroneous output occurs which may appear until the intermediate value is stabilized. Thus, an operation at the time of starting is stabilized.

While the digital offset is changed, the intermediate value is adjusted. Thus, the offset component can be removed without generating any discontinuity in the vibration signal output from the digital high-pass filter 704.

Moreover, the changing amount of the intermediate value at the time of changing the digital offset is adjusted according to the cutoff frequency of the digital high-pass filter 704. Thus, the offset component can be removed more surely.

Next, a third exemplary embodiment of the present invention will be described in detail. A circuitry of an image stabilizing control unit of the exemplary embodiment is similar to that of FIG. 6, and other components of an imaging apparatus are similar to those of the first exemplary embodiment illustrated in FIGS. 1 and 2. Thus, description thereof will be omitted. Referring to the flowchart of FIG. 7 illustrating the image stabilizing operation according to the second exemplary embodiment, the third exemplary embodiment will be described below.

In the digital offset processing of FIG. 7, the increase/decrease of the digital offset is determined based on the intermediate value of the digital high-pass filter 404 (S313). However, as illustrated in FIG. 8A, a size of a changing amount Δoffset of digital offset is determined based on a size of an intermediate value.

A large intermediate value while an angular speed sensor outputs no vibration component means that an A/D converted vibration signal contains many offset components. Thus, to quickly cancel the offset components by digital offset processing, a changing amount Δoffset is increased to quicken convergence to an optimal digital offset value. However, the intermediate value is also increased when the angular speed sensor shakes to change an input value of a digital high-pass filter 404. Consequently, when an changing amount Δoffset of the digital offset is increased, it also follows change of the intermediate value caused by vibration components, so that image stabilizing effects are reduced.

Figure 8A:
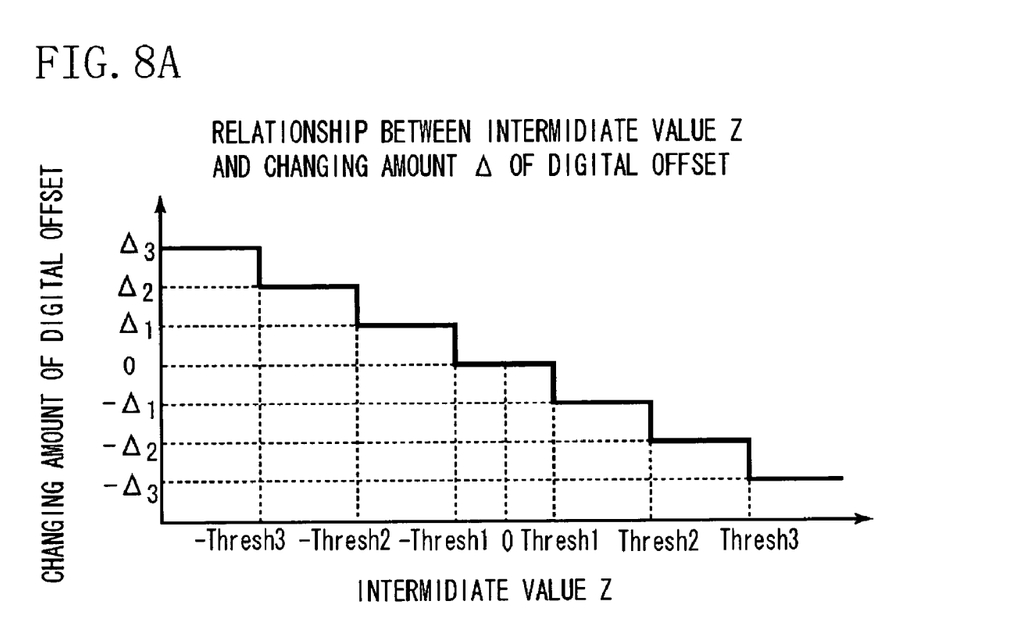
FIGS. 8A and 8B illustrate a relationship among an intermediate value, a changing amount $\Delta$offset of digital offset, and an update period T according to a third exemplary embodiment of the present invention.

For the above reason, as illustrated in FIG. 8A, in consideration of both convergence and image stabilizing effects of the digital offset, a changing amount Δoffset amount of the digital offset is determined according to a size of the intermediate value.

Figure 8B:
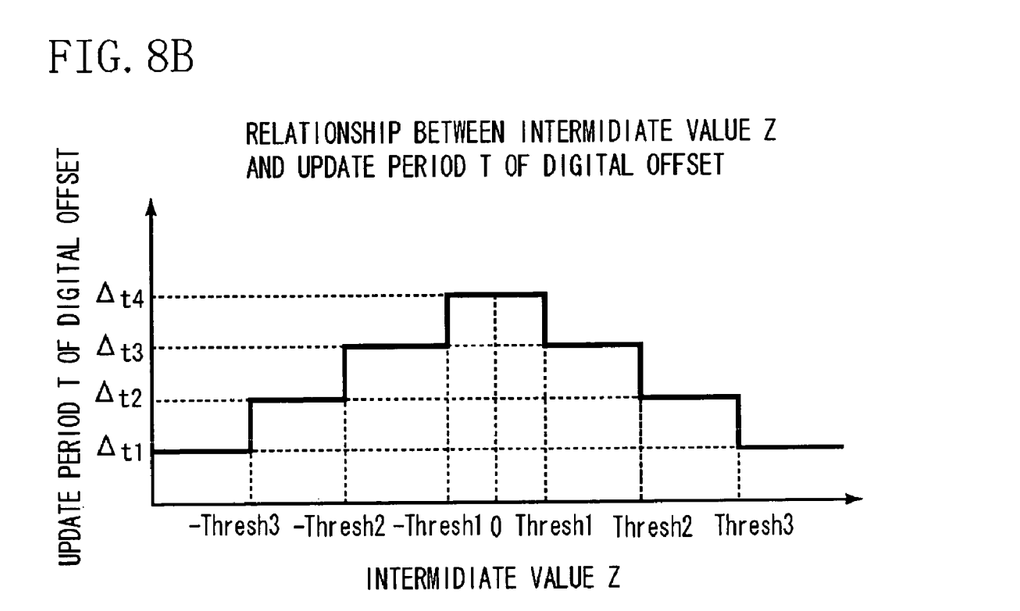

Similarly, FIG. 8B illustrates a relationship between an intermediate value and an update period T of digital offset. A changing amount Δoffset of digital offset represents a changing amount when the digital offset is changed. The update period T represents a time cycle of updating a value of the digital offset.

When an intermediate value is large, the update period T is shortened to quicken convergence of digital offset. The shortened update period T increases followability to a vibration signal, consequently image stabilizing effects are reduced. Thus, as illustrated in FIG. 8B, in consideration of both convergence of the digital offset and image stabilizing effects, the update period T of the digital offset is determined according to a size of the intermediate value.

Referring to FIGS. 8A and 8B, the changing amount Δoffset of the digital offset and the update period T corresponding to the changing amount Δoffset have been described. However, these may be combined.

In the case of the second exemplary embodiment, as described above, the changing amount of the intermediate value Z changes when the cutoff frequency of the digital high-pass filter 704 changes. Similarly, according to the third exemplary embodiment, when the changing amount of the digital offset and the update period T change with respect to the intermediate value, a cutoff frequency causes fluctuation of a threshold value of the intermediate value for the same reason.

The changing amount Δoffset of the digital offset or the update period T may be determined according to a state of the imaging apparatus.

For example, at the time of starting, the changing amount Δoffset of the digital offset is increased to enhance convergence for predetermined time t (e.g. t=1) after the start. Then, after the digital offset is converged and stabilized, the changing amount Δoffset is reduced to increase image stabilizing efficiency.

For moving image shooting, a changing amount Δoffset of digital offset may be set larger than that for static image to give priority to convergence. This may cause a slight reduction in image stabilizing efficiency. However, a moving image mode requires image stabilizing efficiency less than a static image mode. Rather, priority is placed on elimination of the influence of an offset component to perform more stable image stabilizing processing. Thus, a changing amount Δoffset may be changed depending on an imaging mode.

Similar effects can be obtained in the update period T of the digital offset.

These methods and the determination of the changing amount Δoffset or the update period T of the digital offset based on the intermediate value may be combined.

According to the third exemplary embodiment, changing the changing amount Δoffset or the update period T of the digital offset based on the intermediate value enables optimal digital offset processing as described below.

It is presumed that temperature drifting has caused a larger offset component in an A/D converted vibration signal. In this case, by increasing a changing amount Δoffset of digital offset (shortening the update period T) to quicken followability to an optimal digital offset compensation amount, the digital offset processing can be stabilized within a short time. After stabilization of the digital offset processing to a certain extent, by reducing the changing amount Δoffset (extending the update period), the digital offset processing can be continued without deteriorating image stabilizing efficiency so much.

It is further presumed that in the digital high-pass filter which refers to the intermediate value, panning control is performed to change a cutoff frequency based on a state of image stabilizing control. In this case, digital offset processing for changing the changing amount Δoffset of the digital offset and the update period T based on the intermediate value may be executed in place of panning control of the digital high-pass filter.

The first, second, and third embodiments of the present invention have been described by using the primary recursive digital high-pass filter. However, the present invention can be applied not only to the primary recursive digital high-pass filter but also to a nonrecursive digital high-pass filter. As described above referring to FIG. 8A, in the nonrecursive digital high-pass filter, the output of the delay element Z-1 is an intermediate value. Thus, the invention can be similarly applied when a sum total of all intermediate values is referred to and the digital offset is reduced by a predetermined amount if the sum total is larger than 0, and a predetermined amount is added if the sum total is smaller than 0.

A changing amount of an intermediate value X[n−m] in the nonrecursive digital high-pass filter is an addition value Δoffset of a digital offset where m denotes a filter order. In other words, Δoffset only needs to be added to an intermediate value calculated in each order.

The order of the digital low-pass filter is not limit to the primary. As delay elements Z-1 increase, a number of orders increases, resulting in more intermediate values. However, effects similar to those of the exemplary embodiments can be obtained by changing the plurality of intermediate values uniformly to a predetermined value.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application Nos. 2008-061858 filed Mar. 11, 2008, and filed Feb. 6, 2009 which are hereby incorporated by reference herein in their entirety.

What is claimed is:

1. A shake compensation device comprising:
a shake detection unit configured to detect shakes;
a calculation unit configured to calculate a shake compensation amount based on the shake detection result; and
a driving unit configured to compensate for the shakes by moving a compensation member based on the shake compensation amount,
wherein the calculation unit comprises:
a filter unit configured to pass a frequency of a predetermined band of shake signals periodically, wherein the filter unit comprises a delay element which has an intermediate value and that a cut-off frequency is changeable;
an intermediate value reading unit configured to read the intermediate value of the delay element in the filter unit;
an offset calculation unit configured to calculate a changing amount of an offset value based on the intermediate value, and to add an offset value to an output signal of the shake detection unit;
a cutoff frequency reading unit configured to read the cut-off frequency of the filter unit; and
an intermediate value changing unit configured to shift the intermediate value to a predetermined value, wherein the intermediate value changing unit changes the intermediate value based on the cutoff frequency from the cutoff frequency reading unit and the changing amount of the offset value when the offset calculation unit changes the offset value.

2. The device according to claim 1, wherein the offset calculation unit calculates the offset value to remove DC components included in the signal that is based on the output of the shake detection unit.

3. The device according to claim 1, wherein the predetermined value of the intermediate value is zero.

4. The device according to claim 1, wherein the changing of the intermediate value of the filter is carried out within the same period as that of the offset value.

5. The device according to claim 1, wherein the offset calculation unit stops the changing of the offset value during exposure.

6. The device according to claim 1, wherein the intermediate value changing unit adjusts a changing amount of the intermediate value when the offset value is changed according to a cutoff frequency of the filter.

7. The device according to claim 1, wherein an update period is determined based on the intermediate value of the filter or a state of the shake compensation device.

8. The device according to claim 1, wherein the changing amount of the offset value is set so that the larger the changing amount of the offset value is, the shorter an upload period of the intermediate value gets.

9. An optical apparatus including the device according to claim 1.

10. An image capturing apparatus including the device according to claim 1.

* * * * *